United States Patent
Itoo et al.

(10) Patent No.: US 9,945,471 B2
(45) Date of Patent: Apr. 17, 2018

(54) LUBRICATING APPARATUS FOR ROTATING SHAFT

(71) Applicant: KAWASAKI JUKOGYO KABUSHIKI KAISHA, Hyogo (JP)

(72) Inventors: Seiji Itoo, Akashi (JP); Ayumi Hamada, Akashi (JP); Shigeru Nishimura, Kobe (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 15/395,119

(22) Filed: Dec. 30, 2016

(65) Prior Publication Data

US 2017/0108109 A1   Apr. 20, 2017

Related U.S. Application Data

(63) Continuation-in-part of application No. 14/010,890, filed on Aug. 27, 2013, now Pat. No. 9,587,731.

(51) Int. Cl.
*F16H 57/04* (2010.01)

(52) U.S. Cl.
CPC ......... *F16H 57/043* (2013.01); *F16H 57/045* (2013.01); *F16H 57/0423* (2013.01); *F16H 57/0434* (2013.01); *F16H 57/0436* (2013.01); *F16H 57/0441* (2013.01); *F16H 57/0471* (2013.01)

(58) Field of Classification Search
CPC ............. F16H 57/0423; F16H 57/0434; F16H 57/0436; F16H 57/0441; F16H 57/045; F16H 57/0471

USPC ........................................................ 184/6.12
See application file for complete search history.

(56) References Cited

U.S. PATENT DOCUMENTS

| | | | | |
|---|---|---|---|---|
| 2,049,234 | A | * 7/1936 | Thomas | F16H 57/0421 184/11.1 |
| 4,222,283 | A | * 9/1980 | Nagy | F16H 3/089 184/11.2 |
| 4,231,266 | A | * 11/1980 | Nishikawa | F16C 33/6659 184/11.1 |
| 4,480,493 | A | * 11/1984 | Takahashi | F16H 57/0494 184/6.12 |
| 4,644,815 | A | * 2/1987 | Kawano | F16H 3/089 184/6.12 |
| 5,413,462 | A | * 5/1995 | Alberni | F04D 7/045 184/6.23 |

(Continued)

FOREIGN PATENT DOCUMENTS

| | | |
|---|---|---|
| CN | 102155501 | 8/2011 |
| EP | 0 984 207 | 2/2003 |
| JP | 61-12451 | 4/1986 |

*Primary Examiner* — William E Dondero
*Assistant Examiner* — Mark K Buse
(74) *Attorney, Agent, or Firm* — Wenderoth, Lind & Ponack, L.L.P.

(57) ABSTRACT

A lubricating apparatus of the present invention is applied to a transmission having a plurality of rotating shafts, and includes a first rotating shaft having a first oil passage, a second rotating shaft, and an impeller fixed to an axial end of the first rotating shaft. The impeller is arranged in a first oil storage chamber communicated with an outlet of the first oil passage. The impeller rotates with the first rotating shaft to scatter oil, and supplies the oil to the second rotating shaft.

8 Claims, 12 Drawing Sheets

(56) References Cited

U.S. PATENT DOCUMENTS

| | | | | |
|---|---|---|---|---|
| 8,840,511 B2* | 9/2014 | Seno | ............... | F16H 57/0423 |
| | | | | 184/6.12 |
| 8,939,257 B2* | 1/2015 | Nakamura | ............ | F16D 25/123 |
| | | | | 184/6.12 |
| 2002/0096386 A1 | 7/2002 | Kawamoto et al. | | |
| 2011/0198188 A1 | 8/2011 | Kuwashima | | |
| 2013/0305878 A1* | 11/2013 | Seno | ............... | F16H 57/0423 |
| | | | | 74/665 A |
| 2013/0333506 A1* | 12/2013 | Newberry | ............... | B64C 27/14 |
| | | | | 74/467 |
| 2014/0213405 A1* | 7/2014 | Ishikawa | ............... | F16H 57/027 |
| | | | | 475/160 |
| 2015/0060207 A1 | 3/2015 | Nishimura | | |
| 2015/0308559 A1 | 10/2015 | Itoo et al. | | |
| 2017/0108109 A1* | 4/2017 | Itoo | ............... | F16H 57/0434 |

* cited by examiner

LUBRICATING APPARATUS FOR ROTATING SHAFT

CROSS-REFERENCE TO RELATED APPLICATIONS

The disclosure of U.S. patent application Ser. No. 14/010,890 filed on Aug. 27, 2013 including specification, drawings and abstract is incorporated herein by reference in its entirety.

BACKGROUND OF THE INVENTION

Field of the Invention

The present invention relates to a lubricating apparatus for rotating shaft, and in particular, a lubricating apparatus for supplying oil to a plurality of rotating shafts arranged in a case.

Description of the Related Art

The lubricating apparatus is mounted in, for example, a gear transmission to lubricate bearings of the rotating shafts, engaged portions of gears, and fitted portions of the gears and the rotating shafts. Examples of a method of supplying oil include a method of pumping lubricating oil compressed in an oil pump to each portion to be lubricated via passages inner of rotating shafts and a case wall, a method of scraping oil accumulated on a bottom of a case with gears and supplying the oil to each portion to be lubricated (for example, US2015-0060207 A1, US2015-0308559 A1), and an oil mist lubrication method of lubricating each portion to be lubricated with oil mist filled in a case.

In terms of size of the above-mentioned gear transmission, the transmission can be made compact in the horizontal direction orthogonal to the rotating shafts by adjusting layout of the rotating shafts, especially, the height of the rotating shafts. However, when the rotating shafts is located high, the amount of supplied lubricating oil decreases. In addition, high-load and high-speed rotation of the transmission require an increase in the amount of supplied lubricating oil. According to the forced oil supply method using the oil pump, such decrease in the amount of supplied lubricating oil can be addressed by increasing the capacity of the pump. However, since the oil pump is required, the number of parts increases.

SUMMARY OF THE INVENTION

The present invention is devised in light of the problem, and its object is to provide a lubricating apparatus capable of making a transmission including a plurality of rotating shafts compact in a longitudinal direction, as well as supplying a sufficient amount of oil to plurality of rotating shafts of different heights according to high-load and high-speed rotation.

To attain the object, a lubricating apparatus for rotating shaft according to the present invention is a lubricating apparatus for rotating shaft in a case. The lubricating apparatus includes a first rotating shaft including an axially-extending first oil passage, the first oil passage configured to be supplied with oil stored in the case; a second rotating shaft disposed at a distance from the first rotating shaft; a first oil storage chamber communicated with an outlet of the first oil passage, into which the oil supplied to the first oil passage is discharged; and an impeller located in the first oil storage chamber and fixed to an axial end of the first rotating shaft. The impeller is configured to scatter oil in the first oil storage chamber with rotation of the first rotating shaft to supply the oil to the second rotating shaft.

With the above-mentioned configuration, the impeller rotating integrally with the first rotating shaft can scatter oil supplied to the first rotating shaft without using any oil pumping means such as an oil pump, thereby readily supplying the oil to the second rotating shaft.

Preferably, in addition to the above-mentioned configuration, the present invention further includes a pair of support walls for rotatably supporting both axial ends of the second rotating shaft via a pair of respective bearings; a second oil storage chamber surrounded with the one support wall and an axial end surface of the second rotating shaft; an oil storage chamber communicating passage for communicating the first oil storage chamber with the second oil storage chamber. In this case, more preferably, the second rotating shaft has an axially-extending second oil passage, and the bearing located at the other support wall is configured to be supplied with oil in the second oil storage chamber through the second oil passage.

With the above-mentioned configuration, oil scattered by the impeller can be efficiently supplied to the second rotating shaft via the second oil storage chamber. Especially, providing the second oil passage can lubricate the bearing supporting the second rotating shaft.

Preferably, in addition to the above-mentioned main configuration, the lubricating apparatus further includes a plurality of guide ribs protruding from the one support wall toward the axial end surface of the second rotating shaft in the second oil storage chamber, the plurality of guide ribs including one guide rib extending from an radial outer side of the second oil storage chamber to a center portion corresponding to an opening of the second oil passage, and the other guide rib located adjacent to the one guide rib with a distance therebetween. The plurality of guide ribs are configured such that, during rotation of the second rotating shaft, at least two oil flow paths extending from the radial outer portion of the second oil storage chamber toward the center portion along the extending direction of the guide ribs are formed between the adjacent guide ribs.

With the above-mentioned configuration, during rotation of the second rotating shaft, oil can be guided from the radial outer side toward the center portion in at least two oil flow paths, and oil in the second storage chamber can be supplied to the oil passage of the second rotating shaft efficiently and rapidly. This can avoid lack in oil to be supplied to the bearing which supports the second rotating shaft.

Preferably, in addition to the above-mentioned main configuration, the lubricating apparatus further includes a third rotating shaft including a gear portion, the gear portion being at least partially dipped in oil stored in the case. The first oil passage is configured to be supplied with oil scraped by the gear portion due to rotation of the third rotating shaft, and the shaft center line of the second rotating shaft is located above the upper end portion of the gear portion. In this case, more preferably, the lubricating apparatus for rotating shaft is mounted in the vehicle gear transmission, the second rotating shaft is an input shaft receiving a driving force outputted from a motor, and the third rotating shaft is an output shaft outputting a driving force changed by the gear transmission in speed to a driving wheel.

With the above-mentioned configuration, oil scraped by the gear portion of the third rotating shaft can be supplied to the first rotating shaft and the second rotating shaft without using any oil pumping means such as an oil pump. Moreover, even when the shaft center line of the second rotating shaft is located above the upper end portion of the gear portion of the third rotating shaft, oil can be supplied to the second rotating shaft without using any oil pumping means such as an oil pump. Especially, by vertically separating the input shaft from the output shaft, the size in the longitudinal direction orthogonal to the axial direction of the gear transmission can be reduced. Thus, the motor can be disposed close to the shaft for driving the driving wheel.

BRIEF DESCRIPTION OF THE DRAWINGS

The above and other objects, features and advantages of the present invention will be become more apparent from the following description taken in connection with the accompanying drawings, in which.

DETAILED DESCRIPTION OF THE INVENTION

With reference to FIG. 1 to FIG. 12, there will be described an apparatus for lubricating a rotating shaft according to a first embodiment of the present invention. It is to be noted that, for convenience of description, the forward and rearward directions of a vehicle will be referred to as the forward and rearward directions of respective members, and, in the vehicle width direction, the left and right sides of the vehicle when viewed from a person riding in the vehicle (the left and right sides of the vehicle from behind the vehicle) will be referred to as left and right sides of the vehicle and the respective members, for giving description hereinafter.

Figure 1:
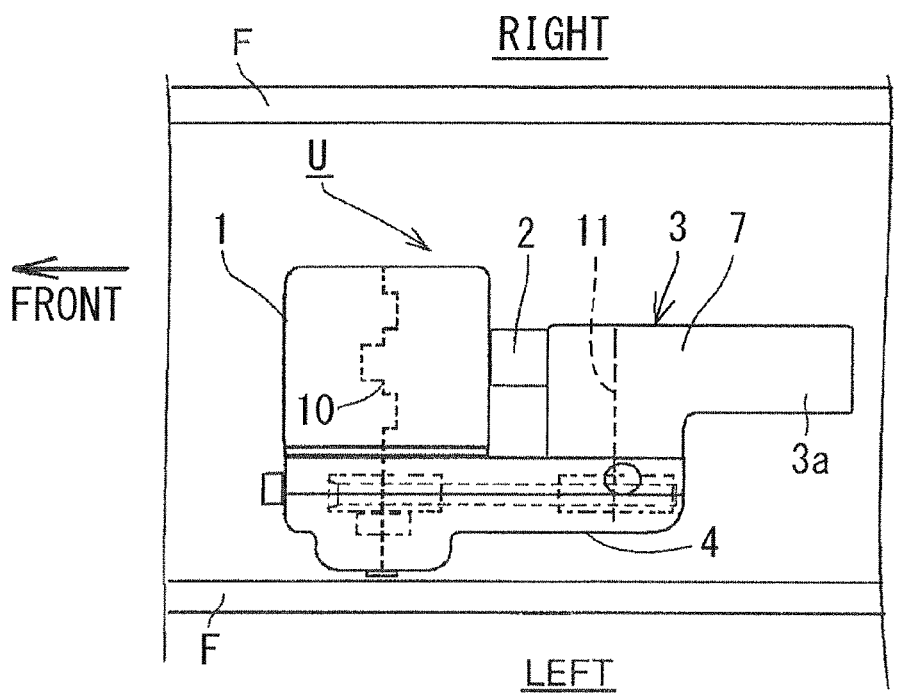
FIG. 1 is a plan view of a vehicle power unit including a lubricating apparatus in a first embodiment of the present invention.
Figure 2:
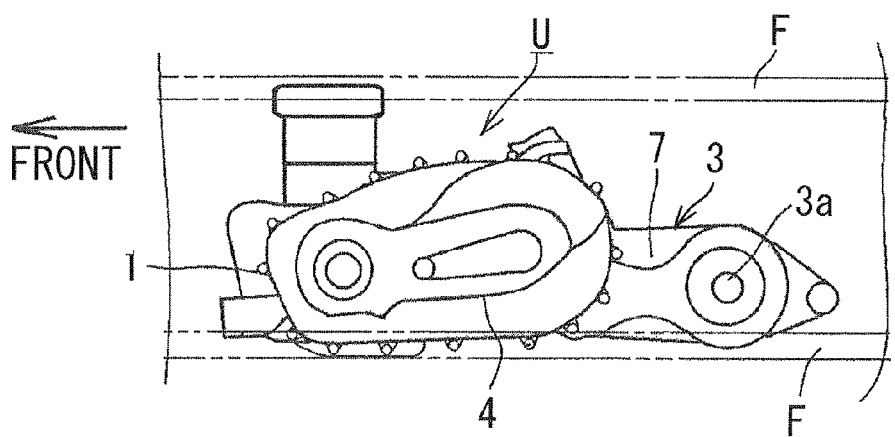
FIG. 2 is a left side view of FIG. 1.

FIG. 1 is a plan view of a vehicle power unit, wherein a power unit U is mounted in a vehicle-body frame F of a utility vehicle, for example, and includes an engine 1, a gear-type transmission 3 coupled to the rear side of the engine 1 with a coupling bracket 2 interposed therebetween, and a V-belt type continuously variable transmission 4 which couples a crank shaft 10 in the engine 1 to an input shaft 11 in the gear-type transmission 3. The V-belt type continuously variable transmission 4 is mounted therein such that the V-belt type continuously variable transmission 4 extends from a left side surface of the engine 1 to a left side surface of the gear-type transmission 3. FIG. 2 is a left side view of the power unit U, wherein the gear-type transmission 3 includes a transmission case 7 and the transmission case 7 is integrally provided with a wheel final speed reducer 3a, at its rear end portion.

Figure 3:
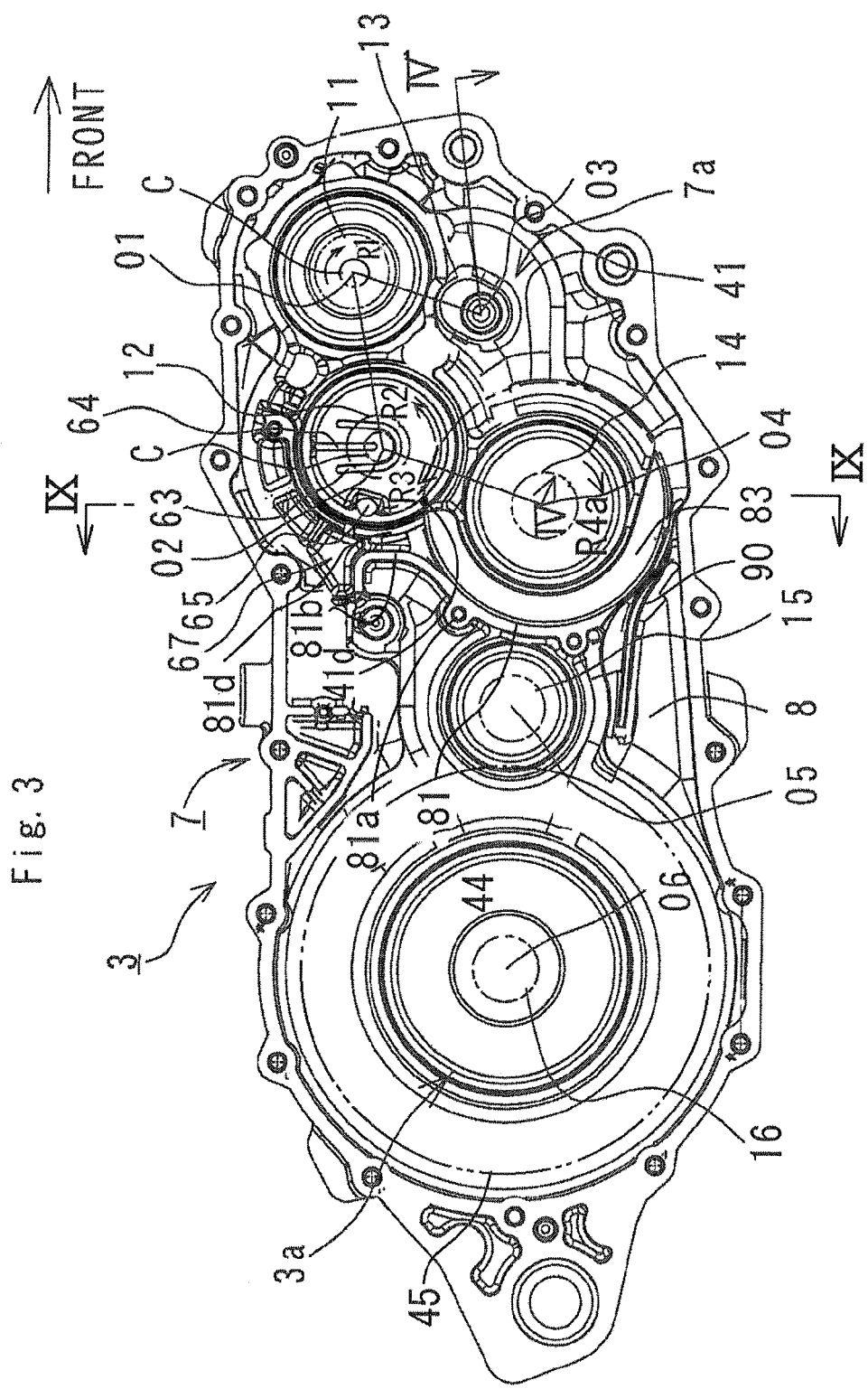
FIG. 3 is an inside view of a left side wall of a gear transmission of the vehicle power unit in FIG. 1 (right side view of the left side wall)

FIG. 3 is an inside view (right side view) of a left side wall 8 of the transmission case 7, and a plurality of shafts in the transmission case 7 are expressed as two-dot chain lines. Within the transmission case 7, there are placed the input shaft 11 having a shaft center line O1, a speed-change shaft 12 having a shaft center line O2, a reverse idle shaft 13 having a shaft center line O3, a power take-off shaft 14 having a shaft center line O4, a pinion gear shaft 15 having a shaft center line O5 in the final speed reducer 3a, and a final gear shaft 16 (rear wheel shaft) having a shaft center line (rear wheel center line) O6 in the final speed reducer 3a. In this embodiment, the speed-change shaft 12 corresponds to "first rotating shaft" recited in claims, the input shaft 11 corresponds to "second rotating shaft" recited in claims, and the power take-off shaft 14 corresponds to "third rotating shaft" recited in claims. In this embodiment, the shaft center line O1 of the input shaft 11 is located higher than an upper end 41d of a power take-off gear 41 fixed to the power take-off shaft 14, and the shaft center line O1 of the input shaft 11 is located higher than the shaft center line O2 of the speed-change shaft 12.

Figure 4:
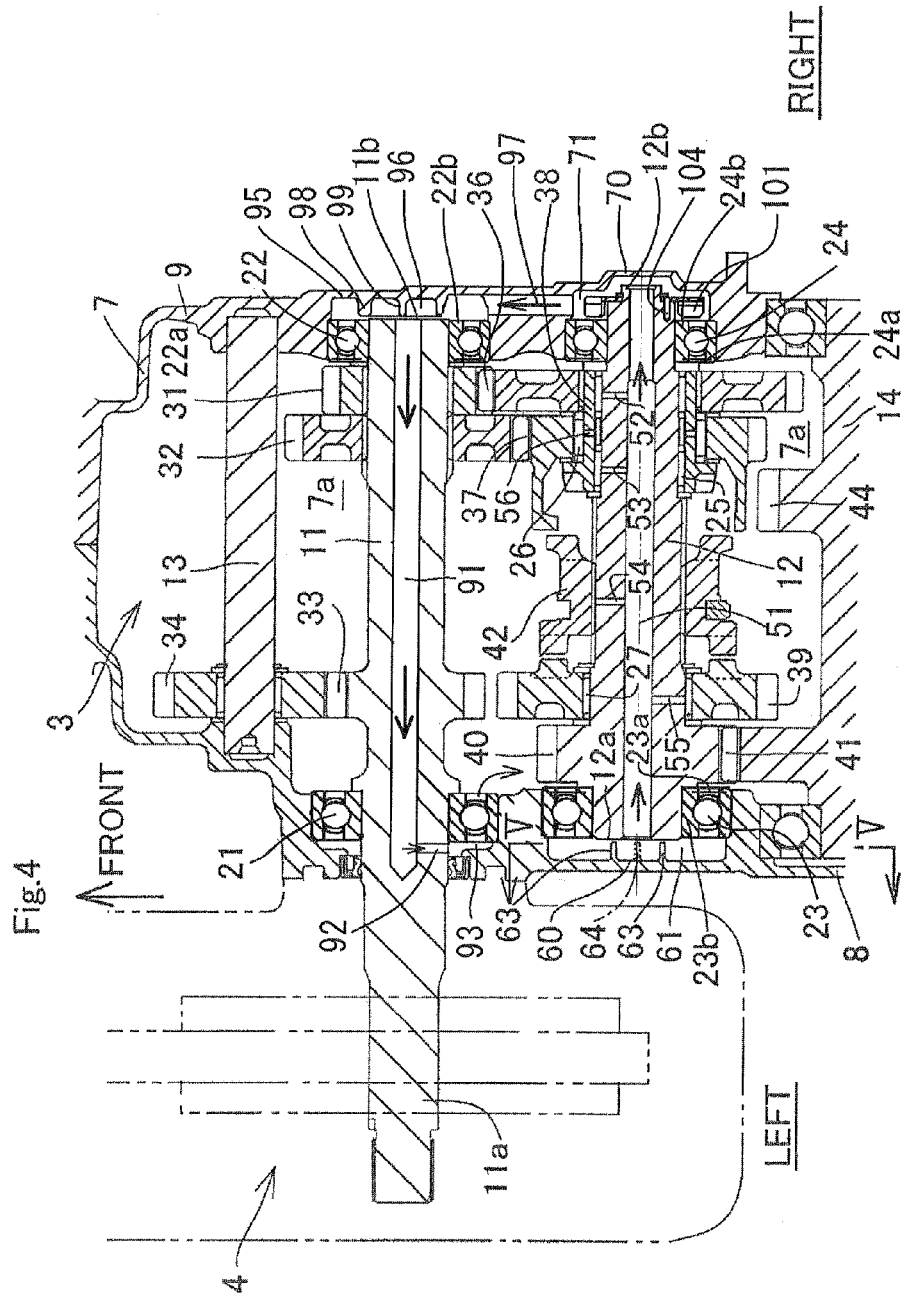
FIG. 4 is a cross-sectional view taken along IV-IV in FIG. 3.

FIG. 4 is a cross-sectional view taken along IV-IV in FIG. 3, wherein the input shaft 11 is rotatably supported by the left side wall (the other supporting wall recited in claims) 8 and a right side wall (one supporting wall recited in claims) 9 of the transmission case 7, with ball bearings 21 and 22 interposed therebetween, respectively. The right ball bearing 22 has a seal, and the left ball bearing 21 has no seal. The left end portion of the input shaft 11 is protruded into the case of the V-belt type continuously variable transmission 4 and is integrally provided with a follower-side pulley shaft 11a. An input-side lower-speed gear 31 and an input-side higher-speed gear 32 are fixed to the input shaft 11 near its right end portion, and an input-side reverse gear 33 is formed integrally with the input shaft 11 near the left end portion of the input shaft 11. The input-side reverse gear 33 engages with a reverse idle gear 34 which is free-rotatably fitted to the reverse idle shaft 13.

The speed-change shaft 12 is rotatably supported by the left side wall 8 and the right side wall 9 of the transmission case 7, with ball bearings 23 and 24 interposed therebetween, respectively. An output-side lower-speed gear 36 engaging with the input-side lower-speed gear 31, and an output-side higher-speed gear 37 engaging with the input-side higher-speed gear 32 are free-rotatably fitted thereto, near the right end portion of the speed-change shaft 12. The output-side lower-speed gear 36 is fixed to the outer peripheral surface of a cylindrical shaft 38 through spline fitting, and the cylindrical shaft 38 is free-rotatably fitted to the outer peripheral surface of the speed-change shaft 12 with a needle bearing 25 interposed therebetween. The output-side higher-speed gear 37 is free-rotatably fitted to the outer peripheral surface of the cylindrical shaft 38 with a needle bearing 26 interposed therebetween. Near the left end portion of the speed-change shaft 12, an output-side reverse gear 39 engaging with the reverse idle gear 34 is free-rotatably fitted to the speed-change shaft 12, and an output gear 40 is formed integrally with the speed-change shaft 12. The output gear 40 engages with a power take-off gear 41 on the power take-off shaft 14. Between the output-side higher-speed gear 37 and the output-side reverse gear 39, there is placed a shift sleeve 42, and the shift sleeve 42 is spline-fitted on the outer peripheral surface of the speed-change shaft 12 such that the shift sleeve 42 can move in the axial direction. Between the opposite end portions of the shift sleeve 42 in the axial direction, and the output-side gears 36, 37 and 39, there are provided respective dog clutches. Namely, by moving the shift sleeve 42 in the axial direction through a shift operation mechanism, which is not illustrated, it is possible to perform changeovers among three speed-change stages, which are a forward-traveling high-speed state, a forward-traveling low-speed state, and a rearward-traveling state.

A rear-wheel driving transmission gear 44 is formed integrally with the power take-off shaft 14. The rear-wheel driving transmission gear 44 engages with the input-side pinion gear shaft 15 in FIG. 3, and the pinion gear shaft 15 engages with a final gear 45 provided on the final gear shaft 16.

[Configuration of Lubricating Apparatus]

In FIG. 4, the speed-change shaft 12 includes a first oil passage 51 extending in the axial direction in its shaft center line portion, and includes a plurality of oil holes 52, 53, 54 and 55 extending in the radial direction. The first oil passage 51 is opened at its opposite ends in the axial direction. Among the plurality of oil holes, the two oil holes 52 and 53 formed in the right-half portion of the speed-change shaft 12 are communicated with the needle bearing 25 on the inner periphery of the cylindrical shaft 38, while the oil hole 54 formed in the speed-change shaft 12 in its middle portion in the axial direction is communicated with the spline-fitting portion in the inner periphery of the shift sleeve 42. The oil hole 55 formed in the speed-change shaft 12 near its left end portion is communicated with a needle bearing 27 on the inner periphery of the output-side reverse gear 39. Further, the cylindrical shaft 38 is provided with a sub oil hole 56 which penetrates therethrough in the radial direction, and the sub oil hole 56 communicates the needle bearing 25 on the inner periphery of the cylindrical shaft 38 with the needle bearing 26 on the outer periphery thereof.

The left ball bearing 23 which supports the left end portion of the speed-change shaft 12 has a seal 23a at its right end portion. The seal 23a, an inner ring 23b in the left ball bearing 23, a left end surface 12a of the speed-change shaft 12, and a concave portion 60 formed in the left side wall 8 of the transmission case 7 form an oil chamber (pre-oil storage chamber) 61. The first oil passage 51 in the speed-change shaft 12 is opened, at its left end, to the oil chamber 61.

The right ball bearing 24 which supports the right end portion of the speed-change shaft 12 has a seal 24a at its left end portion. The right end surface of the right ball bearing 24, a concave portion 70 formed in the right side wall 9 of the transmission case 7, the right end portion of the speed-change shaft 12, and a small-diameter portion 12b formed in the right end portion form a first oil storage chamber 71. The right end (outlet end) of the first oil passage 51 of the speed-change shaft 12 is communicated with the first oil storage chamber 71.

The input shaft 11 has a second oil passage 91 extending in the shaft direction in the shaft center line portion. The left end portion of the second oil passage 91 reaches, in the shaft direction, the vicinity of the left ball bearing 21, and is communicated with an oil exhaust passage 92 extending outward in the radial direction. The outward end of the oil exhaust passage 92 is communicated with an oil exhaust chamber 93 formed on the left side of the left ball bearing 21. The oil exhaust chamber 93 is communicated with the transmission case 7 through the left ball bearing 21.

Figure 7:
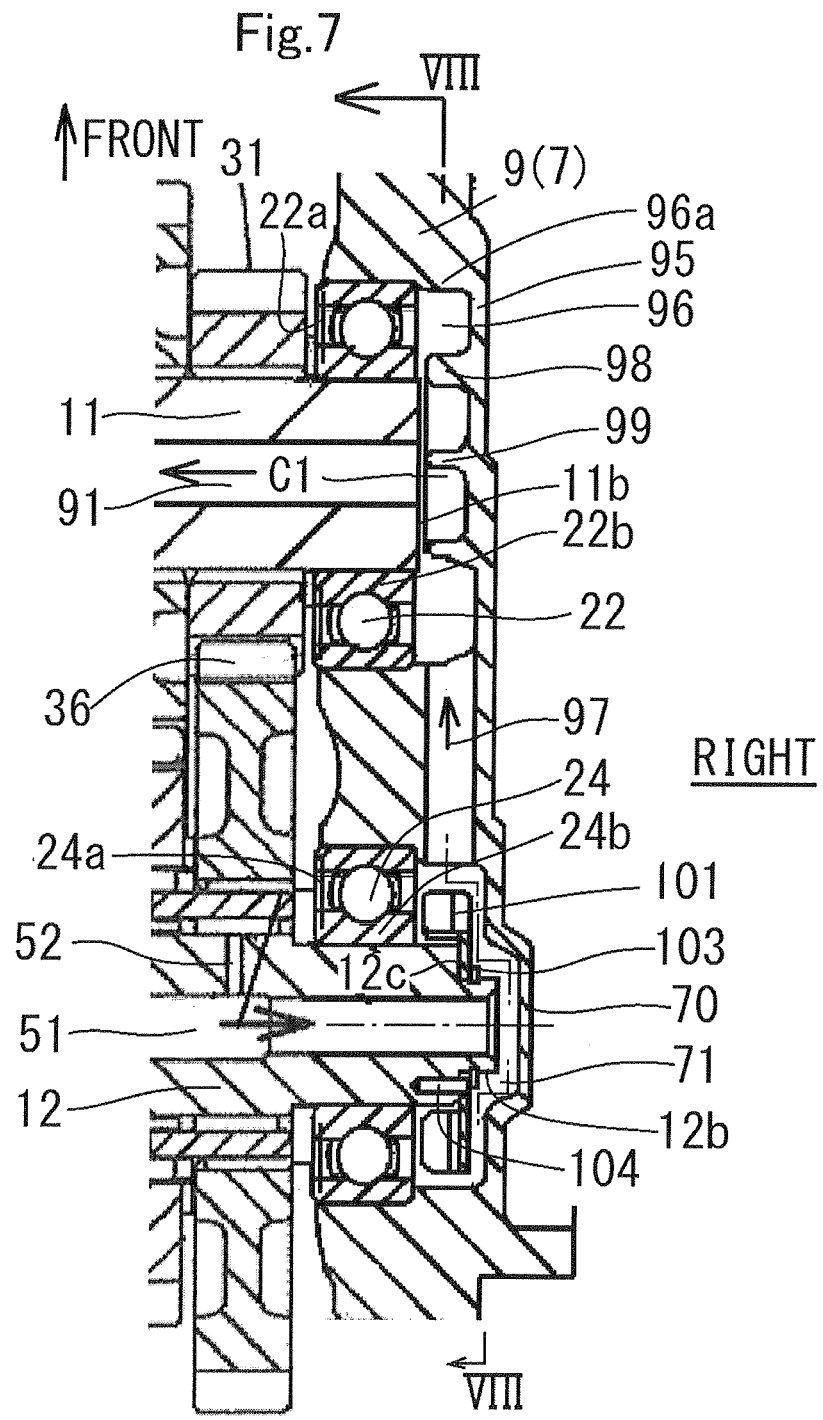
FIG. 7 is an enlarged view of a right end portion of the gear transmission in FIG. 4.

In FIG. 7, the right ball bearing 22 which supports the right end portion of the input shaft 11 has a seal 22a at its left end portion. The seal 22a, an inner ring 22b of the right ball bearing 22, a right end surface 11b of the input shaft 11, a concave portion 95 formed in the right side wall 9 of the transmission case 7 form a second oil storage chamber 96. The right end (inlet end) of the second oil passage 91 is opened to the second oil storage chamber 96.

The second oil storage chamber 96 is located higher than the first oil storage chamber 71. The second oil storage chamber 96 is communicated with the first oil storage chamber 71 via an oil storage chamber communicating passage 97 formed in the right side wall 7.

The small-diameter portion 12b is formed in the right end portion of the speed-change shaft 12 via a stepped portion 12c, and the inner peripheral end of an impeller 101 is fitted to the small-diameter portion 12b. The impeller 101 is circumferentially fixed to the speed-change shaft 12 with three whirl-stop pins 104. The impeller 101 is sandwiched between the stepped portion 12c and the circlip 103, thereby being axially fixed to the speed-change shaft 12. This causes the impeller 101 to rotate integrally with the speed-change shaft 12.

Figure 8:
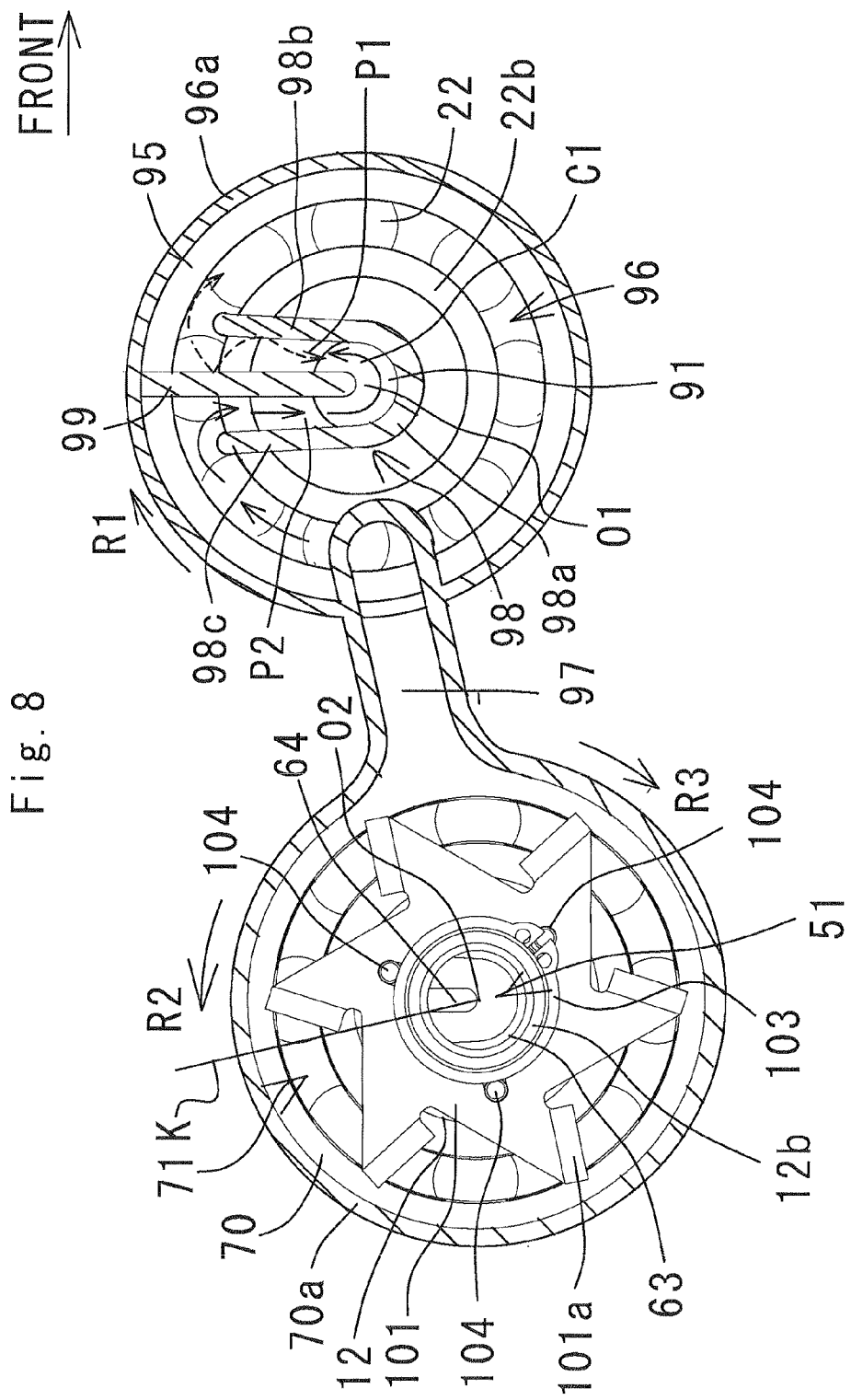
FIG. 8 is an enlarged cross-sectional view taken along VIII-VIII in FIG. 7.

In FIG. 8, the impeller 101 is shaped by bending a sheet metal, and six blades 101a are provided on the outer peripheral end of the impeller 101 at regular intervals in the circumferential direction. The blades 101a each are formed such that its outer radial end is more biased toward a rotating direction R3 expressed as an arrow than the inner radial end. That is, each blade 101a is inclined such that its outer radial end is located closer to the direction R3 than its inner radial end with respect to a radial line K passing the shaft center line O2 of the speed-change shaft 12 and the inner peripheral end of the blade 101a. Thus, when the impeller 101 rotates integrally with the speed-change shaft 12 in a positive rotating direction R2 in forward traveling, oil in the first oil storage chamber 71 scatters outward from the center in the radial direction. The three whirl-stop pins 104 are spaced at regular intervals in the circumferential direction.

Figure 5:
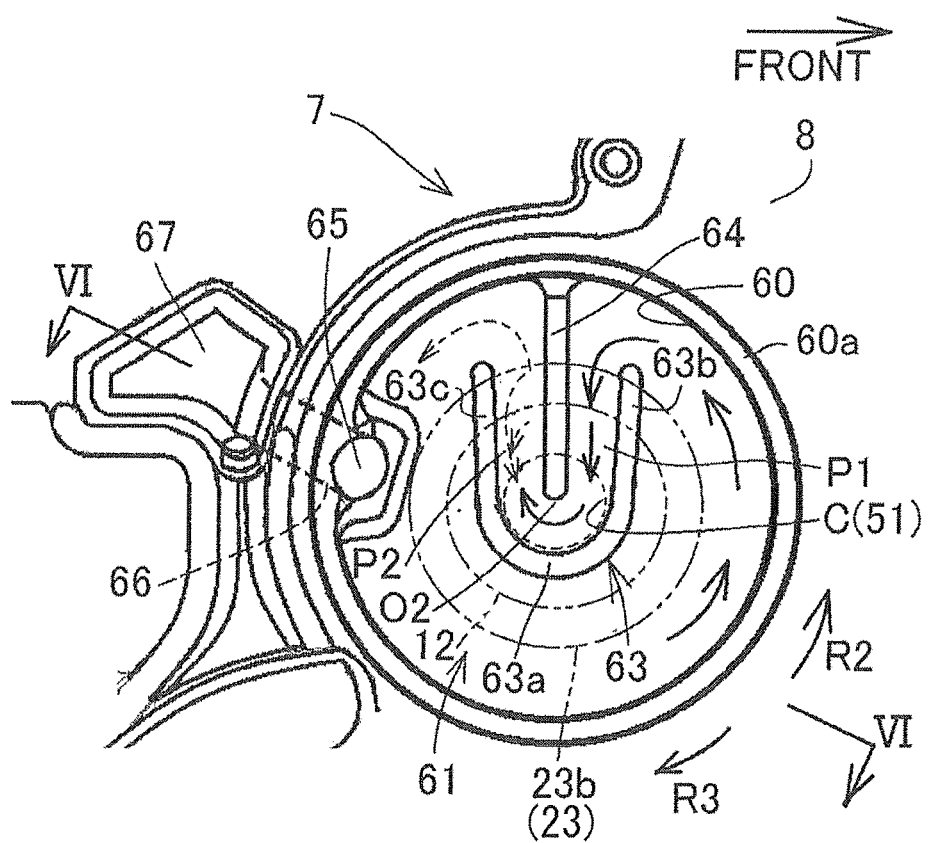
FIG. 5 is a cross-sectional view taken along V-V in FIG. 4.

In FIG. 5, first and second guide ribs 63, 64 for the oil supply chamber, which utilizes rotation of the speed-change shaft 12 to guide oil in the oil supply chamber 61 into the first oil passage 51, are formed in the oil supply chamber 61 located at the left end of the speed-change shaft 12. In FIG. 8, first and second guide ribs 98, 99 for the second oil storage chamber 96, which utilizes rotation of the input shaft 11 to guide oil in the second oil storage chamber 96 into the second oil passage 91, are formed in the second oil storage chamber 96 located at the right end of the input shaft 11. Further, the impeller 101, which sends oil in the first oil storage chamber 71 to the second oil storage chamber 96 through the oil storage chamber communicating passage 97, is arranged in the first oil storage chamber 71 located at the right end of the speed-change shaft 12.

FIG. 5 illustrates shape of the oil supply chamber 61, the first guide rib 63, and the second guide rib 64 in detail. The concave portion 60 formed in the left side wall 8 has a peripheral wall 60a formed in a substantially circular shape, and the oil supply chamber 61 has a center portion C which is substantially coincident, in size and position, with the first oil passage 51 in the speed-change shaft 12. Further, the oil supply chamber 61 has an oil inlet 65 at its rear end portion, and the oil inlet 65 is communicated with an oil intake passage 66 formed in the left side wall 8. The oil intake passage 66 extends rearward and upward, and is communicated with an oil intake room 67 formed posteriorly to the rear end of the peripheral wall 60*a* (outside the oil chamber 61).

Within the oil supply chamber 61, there are provided the first and second guide ribs 63, 64, in order to direct oil at radially-outer portions, namely oil near the peripheral wall 60*a*, toward the center portion C, utilizing the rotation of the speed-change shaft 12. The first and second guide ribs 63, 64 are formed integrally with the left side wall 8. The first guide rib 63 has a bottom portion 63*a* with a half-circular shape which surrounds the center portion C from lower side, and opposite side portions 63*b* and 63*c* with a straight-line shape which extend upwardly from the opposite ends of the bottom portion 63*a*, when viewed in the axial direction. The entire first guide rib 63 is formed to have a substantially U shape. The opposite side portions 63*b* and 63*c* are faced, at their upper ends, to the peripheral wall 60*a*, from a radially-inner side, with a certain interval interposed therebetween. The second guide rib 64 extends downwardly in a substantially-straight-line from the upper end portion of the peripheral wall 60*a*, further protrudes between the opposite side portions 63*b* and 63*c* of the first guide rib 63 and reaches the vicinity of the shaft center line O2 of the speed-change shaft 12. The entire second guide rib 64 is formed to have a substantially I shape. A first oil flow path P1 is formed between the second guide rib 64 and the front side portion 63*b* of the first guide rib 63, and a second oil flow path P2 is formed between the second guide rib 64 and the rear side portion 63*c* of the first guide rib 63. The first oil flow path P1 and the second oil flow path P2 extend downwardly from the upper end of the oil chamber 61 and encounter each other at the center portion C.

Figure 6:
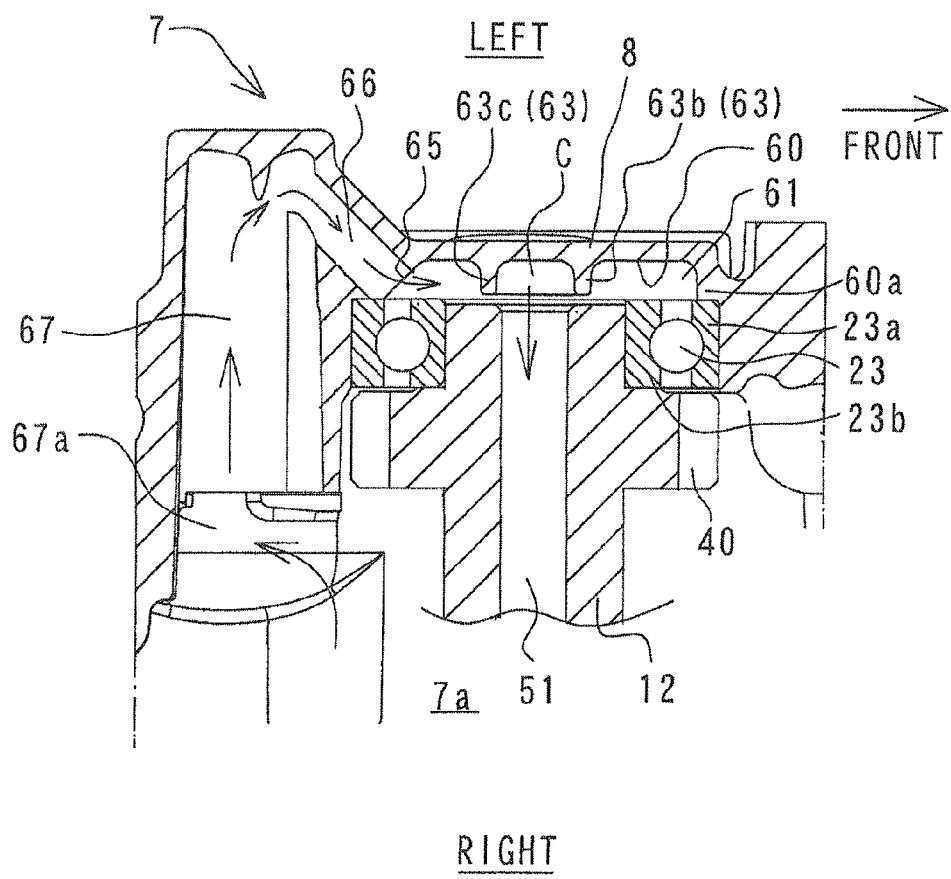
FIG. 6 is a cross-sectional view taken along VI-VI in FIG. 5.

FIG. 6 is a cross-sectional view taken along VI-VI in FIG. 5, wherein the oil intake room 67 extends rightward through the left side wall 8, and the oil intake room 67 is provided, in its right end portion, with a cup-shaped oil receiver portion 67*a* having an upper surface which is opened to the transmission room 7*a*. The oil receiver portion 67*a* is capable of receiving oil having been scraped away by the power take-off gear 41 on the power take-off shaft 14 illustrated in FIG. 3.

In FIG. 8, the second oil storage chamber 96 formed at the right end of the input shaft 11, and the first and second guide ribs 98, 99 are similar to the oil supply chamber 61 and the first and second guide ribs 63, 64 which are described with reference to FIG. 5 and FIG. 6, in shape. Again, there will be described below configuration of the second oil storage chamber 96 and the first and second guide ribs 98, 99.

The second oil storage chamber 96 formed in the right side wall 9 has a peripheral wall 96*a* formed in a substantially circular shape. The first guide rib 98 has a bottom portion 98*a* with a half-circular shape which surrounds the center portion C1 of the second oil storage chamber 96 from lower side, and opposite side portions 98*b* and 98*c* with a straight-line shape which extend upwardly from the opposite ends of the bottom portion 98*a*, when viewed in the axial direction. The entire first guide rib 98 is formed to have a substantially U shape. The opposite side portions 98*b*, 98*c* are faced, at their upper ends, to the peripheral wall 96*a*, from a radially-inner side, with a certain interval interposed therebetween. The second guide rib 99 extends downward in a substantially-straight-line from the upper end portion of the peripheral wall 96*a*, further protrudes between the opposite side portions 98*b* and 98*c* of the first guide rib 98 and reaches the vicinity of the shaft center line O1 of the input shaft 11. The entire second guide rib 99 is formed to have a substantially I shape. A first oil flow path P1 is formed between the front side portion 98*b* of the first guide rib 98 and the second guide rib 99, and a second oil flow path P2 is formed between the rear side portion 98*c* of the first guide rib 98 and the second guide rib 99. The first oil flow path P1 and the second oil flow path P2 extend downward from the upper end of the second oil storage chamber and encounter each other at the center portion C1 of the second oil storage chamber 96.

Next, with reference to FIG. 3 and FIGS. 9 to 12, an oil passage for scraping from an oil reservoir in the bottom portion of the transmission case 7 to the oil intake room 67 will be specifically described below. In FIG. 3, an oil passage forming rib 81 is formed in the left side wall 8 of the transmission case 7, and the oil passage forming rib 81 is protruded rightward. The oil passage forming rib 81 is formed to have an arc-shape in a side view such that the oil passage forming rib 81 faces an outer edge of the power take-off gear 41 from an outside in the radial direction. A right end surface of the oil passage forming rib 81 serves as a plate mounting surface, and is perpendicular to the shaft center line O4 of the power take-off shaft 14. The oil passage forming rib 81 in a side view extends downwardly from the upper end 41*d* of the power take-off gear 41 so as to pass a vicinity of a rear end portion of the power take-off gear 41. However, a lower end of the oil passage forming rib 81 does not reach to a lower end portion of the power take-off gear 41. The oil passage forming rib 81 comes to an end at an intermediate position between the lower end portion of the power take-off gear 41 and the rear end portion thereof. A pair of mounting boss portions 81*a* is formed in a rear surface of the oil passage forming rib 81, and each of the mounting boss portions 81*a* has a female screw. An extended rib 81*b* is integrally formed in the oil passage forming rib 81 at is upper end, and extended upward to the oil intake room 67. Further, a rib 81*d* is formed in the left wall 8 such that the rib 81*d* faces the extended rib 81*b* from a forward side, by a predetermined distance.

A lower rib 90 different from the oil passage forming rib 81 is formed integrally with the left side wall 8 of the transmission case 7. The lower rib 90 is located under the oil passage forming rib 81, and faces a rear-lower portion of the power take-off gear 41 from outside in the radial direction.

An oil passage forming surface 83 is formed on the left side wall 8 of the transmission case 7. The oil passage forming surface 83 is formed to have an arc shape (half circular shape) along a certain circle as a center which is the shaft center line O4 of the power take-off shaft 14. The oil passage forming surface 83 is included in a plane which is perpendicular to the shaft center line O4 of the power take-off shaft 14, and faces an outer portion of the power take off gear 41 from a left side. A guide plate 72 for forming an arc-like oil passage illustrated in FIG. 10 is fixedly attached to the plate mounting surface (right end surface) of the oil passage forming rib 81.

Figure 10:
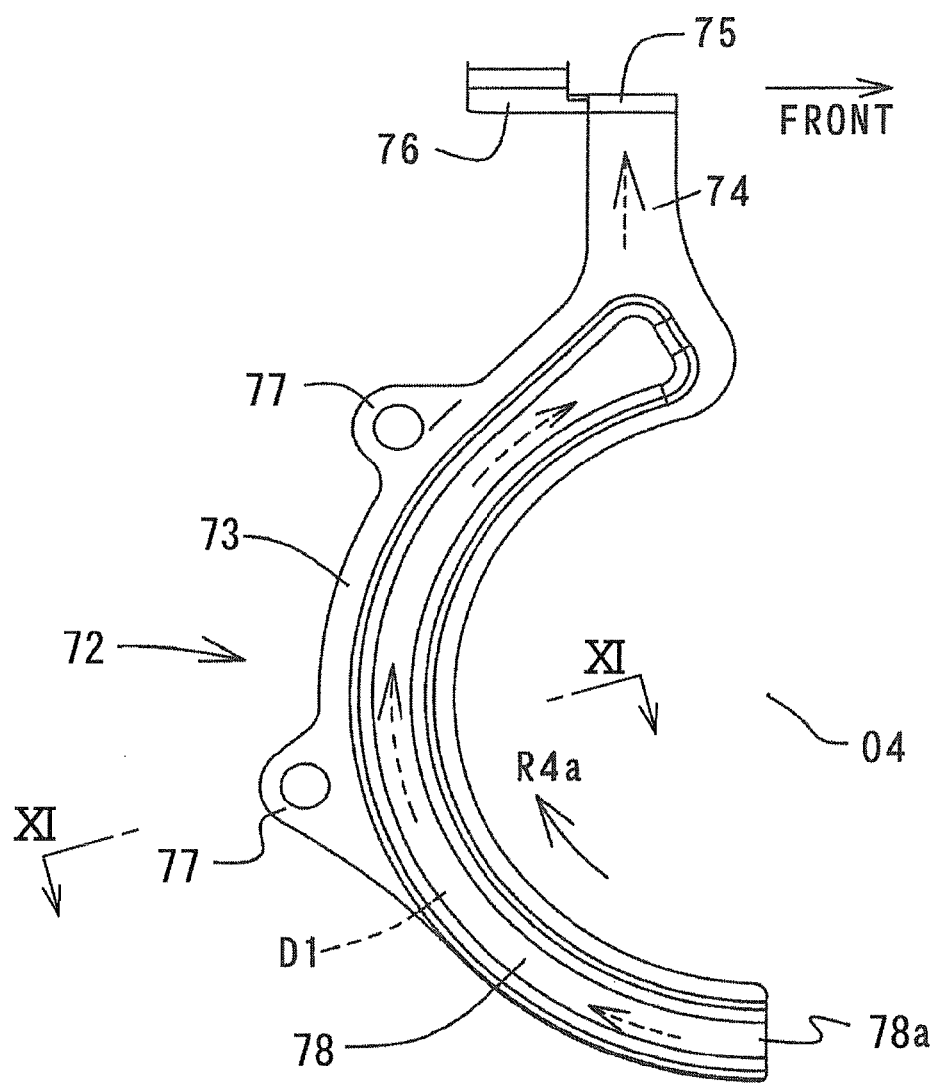
FIG. 10 is a right side view of a guide plate.
Figure 12:
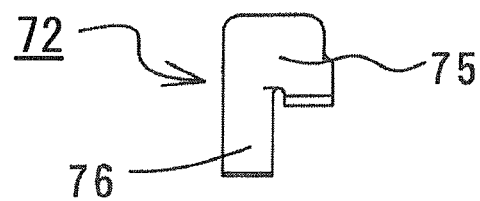
FIG. 12 is a plan view of an upper end of the guide plate.

In FIG. 10, the guide plate 72 integrally has a plate body 73 formed to have an arc-shape (substantially half-circle shape) such that the plate body 73 is protruded rearward in side view, an upper extended portion 74 linearly extended upward from an upper end of the plate body 73, an upper wall portion 75 bent leftward from an upper end of the upper extended portion 74, and a roof portion 76 that is formed in the rear of the upper wall portion 75 and is extended rightward (FIG. 12). A pair of upper and lower attachments 77 each having an attachment hole are integrally formed on a rear end of the plate body 73, and a recess portion 78 dented rightward for extending an oil passage is integrally formed over an entire length of the plate body 73 from a lower end to an upper end of the plate body 73. A lower end 78*a* of the recess portion 78 is opened forward.

Figure 11:
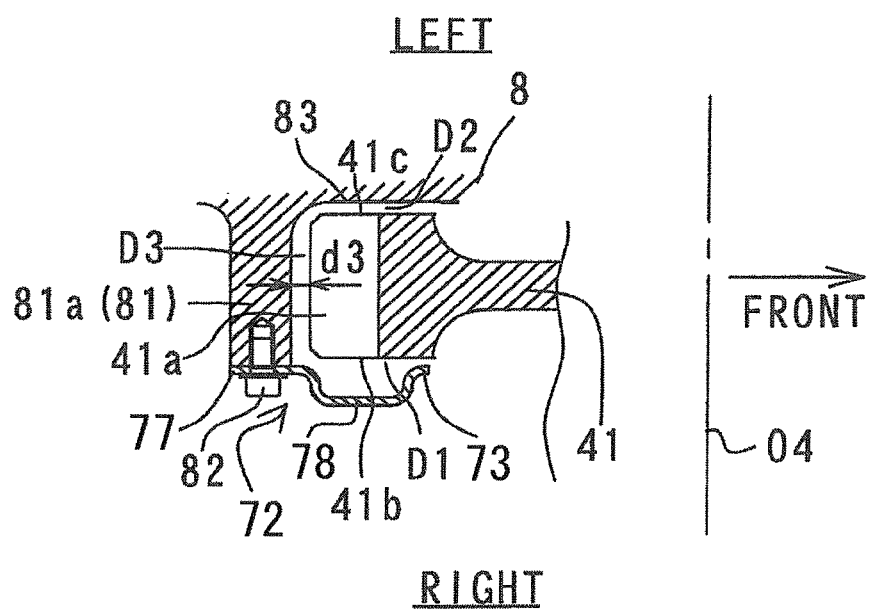
FIG. 11 is an enlarged cross-sectional view of an oil passage for scraping taken along XI-XI in FIG. 10.

In FIG. 11, the oil passage includes a right oil passage D1 constituted by a space between a right end surface 41*b* of the outer peripheral portion of the power take-off gear 41 and the plate body 73 facing the right end surface 41*b* from the right side, a left oil passage D2 constituted by a space between a left end surface 41*c* of the power take-off gear 41 and the oil passage forming surface 83 of the left side wall 8 facing the left end surface 41*c* from the left side, and an outer peripheral oil passage D3 constituted by a space between an outer peripheral end of an outer tooth 41*a* of the power take-off gear 41 and an inner wall face of the oil passage forming rib 81 facing the outer peripheral end from the radial outer side.

Figure 9:
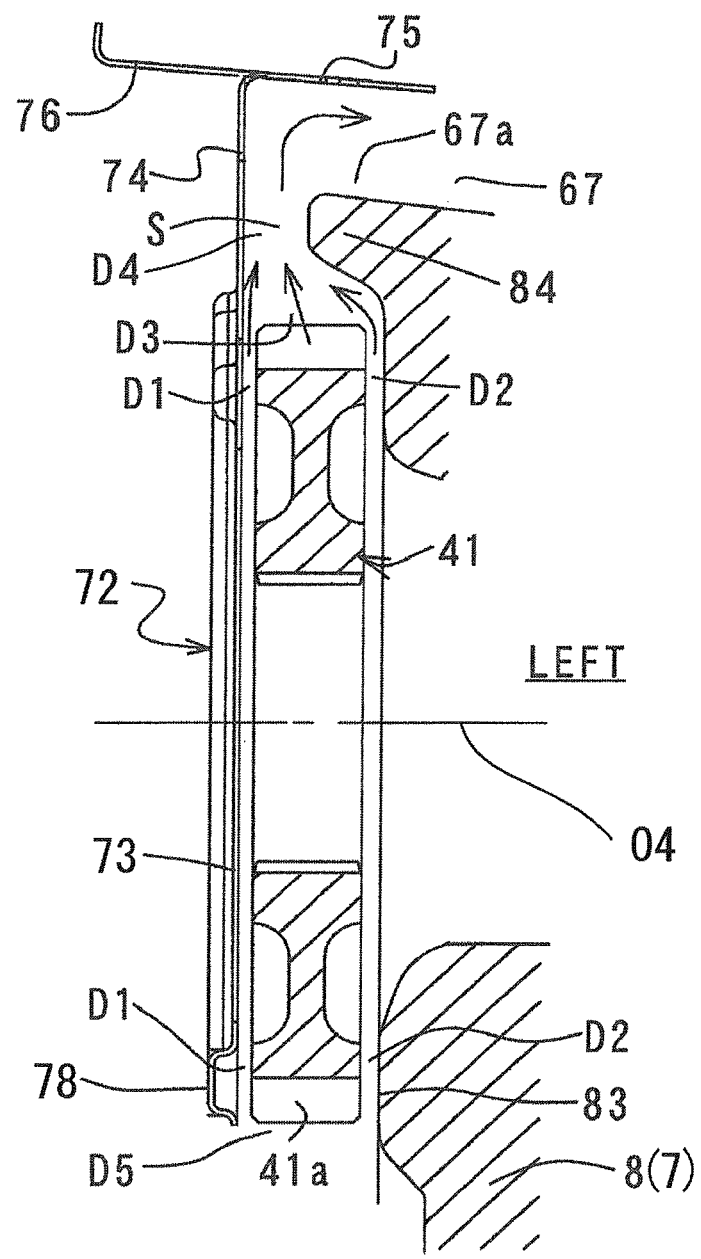
FIG. 9 is an enlarged cross-sectional view taken along IX-IX in FIG. 3.

Further, in FIG. 9, the oil passage includes an extended oil passage D4 which extends upward from the upper end of the outer peripheral oil passage D3, and has a narrowed portion S, and lower oil passage D5 which extends forward and downward from the lower end of the outer peripheral oil passage D3, and reaches the oil reservoir in the bottom portion of the transmission case 7.

[Actions]

In FIG. 3, the input shaft 11 rotates in the regular rotating direction R1 of arrow (regular rotating direction) irrespective of whether the vehicle travels forward or backward. The speed-change shaft 12 rotates in the rotating direction R2 (positive rotating direction) during forward traveling, and rotates in the rotating direction R3 (negative rotating direction) during backward traveling.

In FIG. 5, when the vehicle travels forward, the speed-change shaft 12 rotates in the rotating direction R2, and oil in the oil supply chamber 61 moves in the positive rotating direction R2 of the speed-change shaft 12 and the inner ring 23*b* of the bearing 23, and is pressed onto the inner surface of the peripheral wall 60*a* by a centrifugal force. In the upper end portion of the forward half of the oil supply chamber 61, oil hits against the forward surface of the upper portion of the second guide rib 64 from the front side. The oil is guided to the radial inner side by the second guide rib 64, and flows toward the center portion C in the first oil flow path P1. The oil reaching the center portion C is turned upward by the bottom portion 63*a*, and attempts to flow upward in the second oil flow path P2.

On the contrary, in the upper end portion of the rear half of the oil supply chamber 61, as represented by a broken arrow, a portion of oil hits against the upper end portion of the rear side portion 63*c* of the first guide rib 63 due to rotation of the speed-change shaft 12 and the inner ring 23*b* of the bearing 23 in the positive rotating direction R2 from the front side, and is guided toward the center portion C in the second oil flow path P2.

A first oil flow which passes through the first oil flow path P1 and makes a U-turn in the bottom portion 63*a* and a second oil flow which flows downward in the second oil flow path P2 hit against each other in the middle of the second oil flow path P2, and the pressure at the hitting site and surroundings becomes high.

The oil compressed at the hitting site and surroundings as described above is efficiently supplied from the center portion C of the oil supply chamber 61 into the first oil passage 51.

In FIG. 4, the oil supplied from the oil supply chamber 61 into the first oil passage 51 of the speed-change shaft 12 by the first and second guide ribs 64, 65 flows rightward in the first oil passage 51. The oil passes through the oil holes 52, 53, 54, and 55, and is supplied to respective sites to be lubricated to lubricate the sites. That is, the oil flowing into the leftmost oil hole 55 is supplied to the needle bearing 27 of the output-side reverse gear 39, the oil flowing into the middle oil hole 54 in the axial direction is supplied to a spline fitting portion of the shift sleeve 42, and the oil flowing into the two right oil holes 52, 53 is supplied to the needle bearing 25 inside the cylindrical shaft 38. Further, the oil flowing into the oil hole 56 of the cylindrical shaft 38 is supplied to the needle bearing 26 of the output-side higher-speed gear 37.

The oil which does not flow into the oil holes 52, 53, 54, and 55 and reaches the right end of the first oil passage 51 is discharged into the first oil storage chamber 71.

In FIG. 7, the oil flowing into the first oil storage chamber 71 lubricates the right ball bearing 24, and also is scattered to the radial outer side by the impeller 101 rotating integrally with the speed-change shaft 12, and then, is supplied to the second oil storage chamber 96 through the oil storage chamber communicating passage 97.

In the second oil storage chamber 96, oil lubricates the right ball bearing 22 which supports the input shaft 11. Simultaneously, as in the case of the oil supply chamber 61, due to rotation of the input shaft 11, rotation of the inner ring 22*b* of the right ball bearing 22, and effects of the inner peripheral surface of the peripheral wall 96*a* and the first and second guide ribs 98, 99, oil is guided inward to the center portion C1 in the radial direction, and in turn, to the second oil passage 91 of the input shaft 11.

Describing in detail, in FIG. 8, oil in the second oil storage chamber 96 moves in the regular rotating direction R1 of the input shaft 11 and the inner ring 22*b* of the bearing 22, and is pressed onto the peripheral wall 96*a* by a centrifugal force. In the upper end portion of the rear half of the second oil storage chamber 96, oil hits against the rear surface of the upper portion of the second guide rib 99 from the rear side, and is guided to the radial inner side by the second guide rib 99 to flow toward the center portion C1 in the second oil flow path P2. The oil reaching the center portion C1 is turned upward by the bottom portion 98*a*, and attempts to flow upward in the first oil flow path P1.

On the contrary, in the upper end portion of the front half of the second oil storage chamber 96, as represented by a broken arrow, a portion of oil hits against the upper end portion of the front side portion 98*b* of the first guide rib 98 from the rear side due to rotation of the input shaft 11 and the inner ring 22*b* of the bearing 22 in the regular rotating direction R1, and is guided toward the center portion C1 in the first oil flow path P1.

An oil flow which passes through the second oil flow path P2 and makes a U-turn in the bottom portion 98*a* and an oil flow which flows downward in the first oil flow path P1 hit against each other in the middle of the first oil flow path P1, and the pressure at the hitting site and surroundings becomes high.

The oil compressed at the hitting site and surroundings as described above is efficiently supplied from the center portion C1 of the second oil storage chamber 96 into the second oil passage 91.

In FIG. 4, in the left end portion of the second oil passage 91, oil flowing leftward in the second oil passage 91 passes through the oil exhaust passage 92, and is discharged to the oil exhaust chamber 93. The oil in the oil exhaust chamber 93 passes the left ball bearing 21 to lubricate the left ball bearing 21 and then, is returned to the transmission room 7*a*.

The oil flow from the transmission room 7*a* to the oil intake room 67 in FIG. 3 is as follows. When the vehicle travels forward, the power take-off gear 41 rotates in a rotating direction R4a, and in the vicinity of the lower end portion of the power take-off gear 41, oil stored in the lower portion of the transmission room 7a is scraped or drawn into the first, second, and third oil passages D1, D2, D3, and the lower oil passage D5 in FIG. 9. Then the oil is transferred upward along the outer circumference of the power take-off gear 41 in the first, second, and third arc-like oil passages D1, D2, and D3.

The oil transferred to the upper end portion of the power take-off gear 41 flows into the extended oil passage D4, and is pressed in the narrowed portion S to be jetted upward.

The oil jetted upward is guided to the upper wall portion 75 and the roof portion 76, is discharged to the left oil receiver portion 67a, and flows into the oil intake room 67.

In FIG. 5, the oil temporarily stored in the oil intake room 67 flows forward and downward in the oil intake passage 66 by gravitation, and reaches the oil supply chamber 61.

When the vehicle travels backward, in FIG. 3, the speed-change shaft 12 rotates in the rotating direction R3. Oil in the transmission room 7a is scraped forward and upward by the outer tooth 41a of the power take-off gear 41. A portion of the oil scraped forward and upward scatters upward along the outer circumference of the front half of the power take-off gear 41, hits against the upper wall portion 75 and the roof portion 76 in FIG. 9, and is supplied to the oil receiver portion 67a.

The amount of oil which is scraped due to rotation of the power take-off gear 41 in the rotating direction R3, and reaches the oil receiver portion 67a is smaller than the amount of oil transferred due to rotation of the power take-off gear 41 in the rotating direction R2. However, the frequency of vehicle backward traveling is much smaller than the frequency of vehicle forward traveling, and the gear rotating speed is low during backward traveling, the amount of oil never lacks during backward traveling.

When the vehicle travels backward, in FIG. 5, oil in the oil supply chamber 61 is moved in the same direction as the rotating direction R3 of the speed-change shaft 12 and the inner ring 23b of the bearing 23 by rotation, and is pressed onto the inner surface of the peripheral wall 60a by a centrifugal force. Since the rotating direction of the speed-change shaft 12 at backward traveling is opposite to the rotating direction of the speed-change shaft 12 at forward traveling, the flow of oil is reversed, and becomes the same as the flow of oil in the second oil storage chamber 96 in FIG. 8. That is, the function of the first oil flow path P1 at forward traveling is performed by the second oil flow path P2 at rearward traveling, and the function of the second oil flow path P2 at forward traveling is performed by the first oil flow path P1 oil flow at rearward traveling. Accordingly, the first and second oil flows hit against each other in the middle of the first oil flow path P1, and the pressure thereof becomes high. Thus, oil is efficiently supplied into the oil passage 51 of the speed-change shaft 12.

When the vehicle travels backward, in FIG. 8, in the first oil storage chamber 71, the impeller 101 along with the speed-change shaft 12 rotates in the rotating direction R3, and attempts to guide oil in the first oil storage chamber 71 toward the radial inner side. However, oil is sequentially supplied from the first oil passage 51, and gradually increases to be supplied to the second oil storage chamber 96.

Effects of First Embodiment (1) The lubricating apparatus includes a first oil storage chamber 71 communicated with an outlet of the first oil passage 51 of the speed-change shaft 12, and an impeller 101 which is arranged in the first oil storage chamber 71 and is fixed to an axial end of the speed-change shaft 12. Oil supplied to the first oil passage 51 of the speed-change shaft 12 is supplied to the second oil passage 91 of the input shaft 11 due to rotation of the impeller 101. In this manner, the oil supplied to the speed-change shaft 12 can be readily supplied to the input shaft 11 located above the speed-change shaft 12 without using an oil pumping means such as an oil pump.

(2) Both axial ends of the input shaft 11 are rotatably supported by the left and right side walls 8, 9 of the transmission case 7 through the left and right bearings 21, 22, respectively. The lubricating apparatus includes a second oil storage chamber 96 surrounded with the right side wall 9 and the axial end surface of the input shaft 11, and an oil storage chamber communicating passage 97 which communicates the first oil storage chamber 71 with the second oil storage chamber 96. With this configuration, the oil scattered by the impeller 101 can be efficiently supplied to the input shaft 11 through the second oil storage chamber 96.

(3) The input shaft 11 includes an axially-extending second oil passage 91. The ball bearing 21 located on the left side wall 8 is configured to receive oil in the second oil storage chamber 96 through the second oil passage 91 and the oil exhaust passage 92. This can lubricate the bearing 21 which supports the input shaft 11 on the left side wall 8.

(4) The second oil storage chamber 96 includes first and second guide ribs 98, 99 which protrude from the right side wall 9 toward the axial end surface of the input shaft 11. The second guide rib 99 linearly extends from the radial outer side of the second oil storage chamber 96 toward the center portion C1 corresponding to an opening of the second oil passage 91. The first guide rib 98 is shaped like U when viewed in the axial direction, and the bottom portion 98a is located at a position substantially corresponding to the second oil passage 91 when viewed in the axial direction. The side portions 98b, 98c of the first guide rib 98 face the second guide rib 99 with a distance therebetween. Then, the first oil flow path P1 and the second oil flow path P2 are formed between the second guide rib 99 and the side portions 98b, 98c of the first guide rib 98. The oil flow paths P1, P2 extend from the radial outer side of the second oil storage chamber 96 toward the center portion. With this configuration, during rotation of the input shaft 11, oil can be guided from the radial outer side toward the center portion in at least two oil flow paths P1, P2, and the oil in the second oil storage chamber 96 can be supplied to the second oil passage 91 of the input shaft 11 efficiently and rapidly. This can prevent lack in oil supplied to the bearings 21, 22 which support the input shaft 11.

(5) The power take-off shaft 14 has the power take-off gear 41 at least partially dipped in oil stored in the bottom of the transmission case 7, and oil scraped by rotation of the power take-off gear 41 is supplied to the first oil passage 51 of the speed-change shaft 12. Moreover, the shaft center line O2 of the speed-change shaft 12 is located above the upper end 41d of the power take-off gear 41. With this configuration, oil scraped by the power take-off gear 41 can be supplied to the speed-change shaft 12 and the input shaft 11 without using any oil pumping means such as an oil pump. Moreover, even when the shaft center line O1 of the input shaft 11 is located above the upper end portion of the power take-off gear 41, oil can be supplied to the input shaft 11 without using any oil pumping means such as an oil pump.

(6) Since the input shaft 11 is vertically separated from the power take-off shaft 14, the entire of the gear transmission in the anteroposterior direction can be made compact. Thereby, an engine 1 can be arranged close to the final gear shaft (rear shaft) 16 which drives the driving wheel.

Second Embodiment

Figure 13:
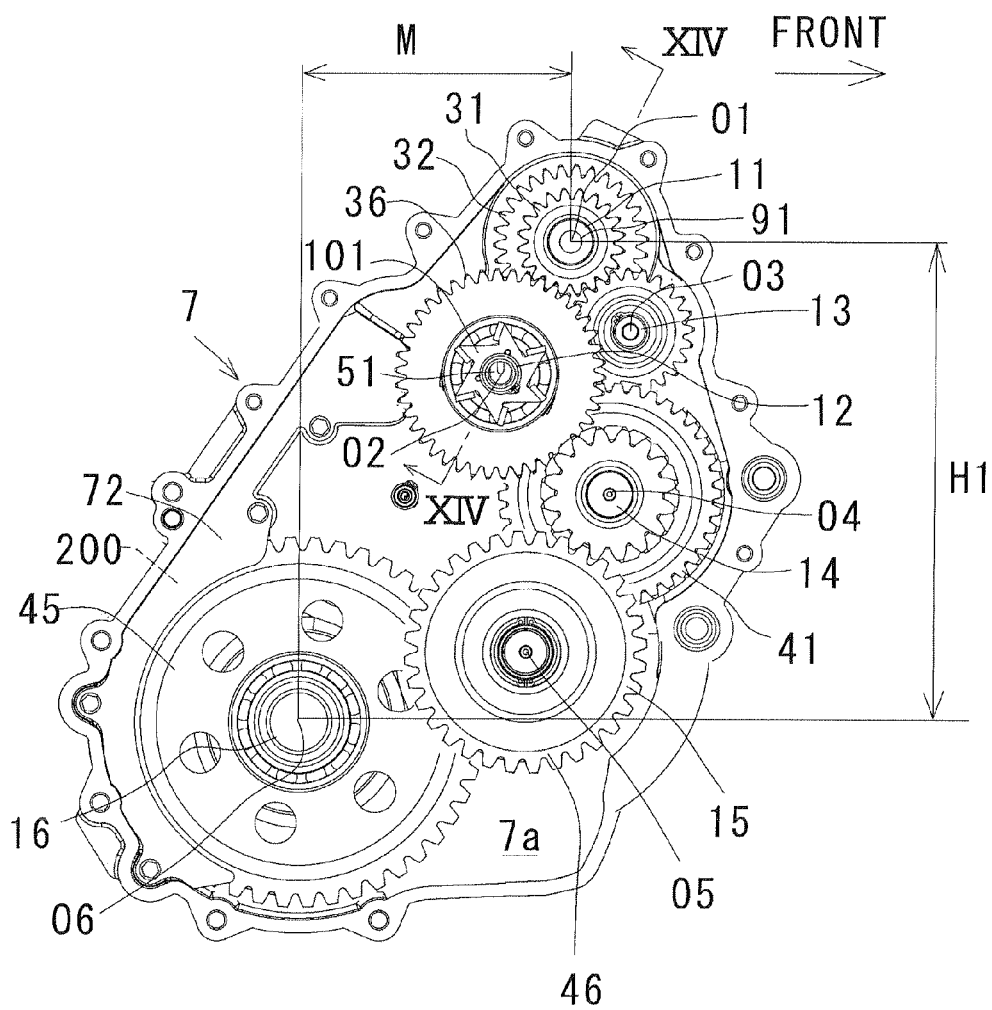
FIG. 13 is a cross-sectional view of a second embodiment of the present invention, which is similar to FIG. 3.
Figure 14:
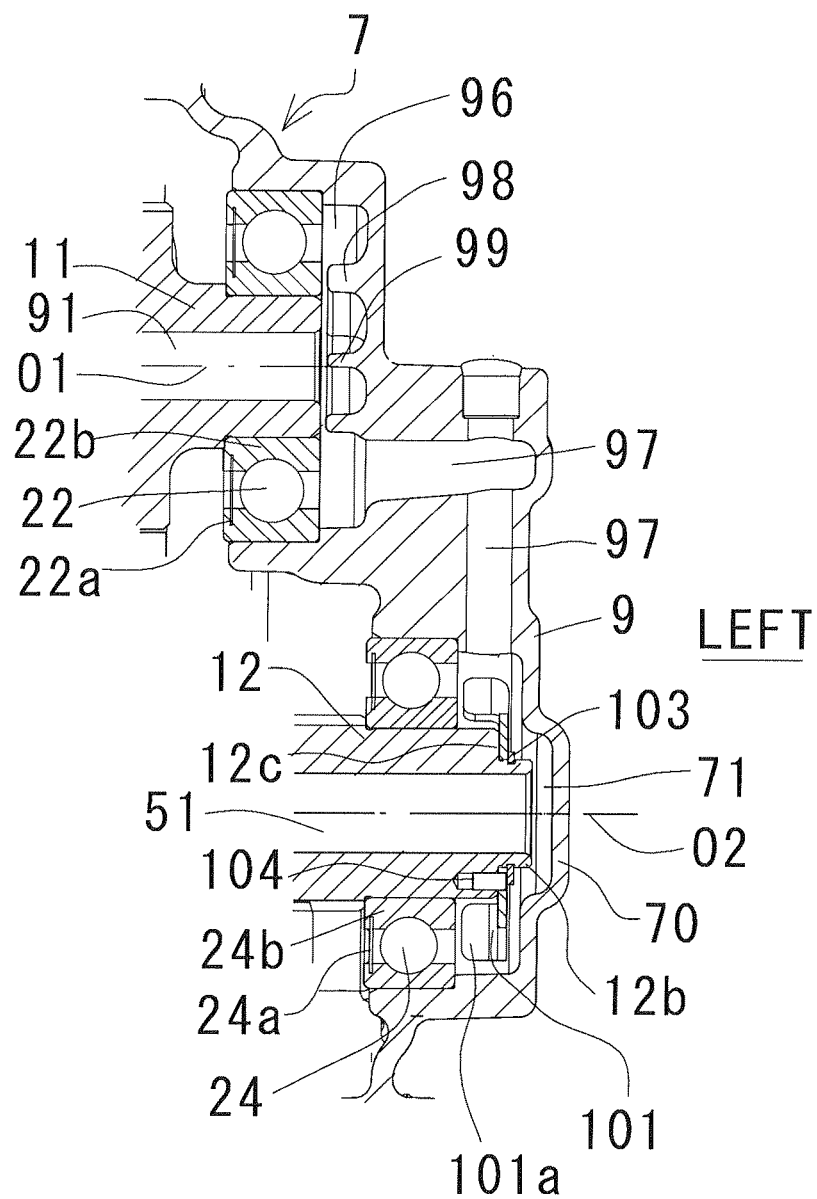
FIG. 14 is an enlarged cross-sectional view taken along XIV-XIV in FIG. 13.

FIG. 13 and FIG. 14 illustrate a second embodiment. The second embodiment is different from the first embodiment in that, as illustrated in FIG. 13, a distance M between the shaft center line O1 of the input shaft 11 and the shaft center line O6 of the final gear shaft 16 in the longitudinal direction is much smaller than the distance in the first embodiment illustrated in FIG. 3. Further, the final gear 45 is used as a gear portion for scraping oil stored in the bottom of the transmission case 7. That is, the final gear shaft 16 is adopted as a third rotating shaft (output shaft) for scraping oil as recited in claims. The configuration other than the difference in the second embodiment is the same as the configuration in the first embodiment, and the same parts as those in the first embodiment are given the same reference numerals.

In FIG. 13, the power take-off shaft 14, the speed-change shaft 12, the reverse idle shaft 13, and the input shaft 11 are arranged in this order from the pinion gear shaft 15 to the upper side in a zig-zag manner. Moreover, the shaft center line O1 of the input shaft 11, the shaft center line O2 of the speed-change shaft 12, the shaft center line O3 of the reverse ide shaft 13, and the shaft center line O4 of the power take-off shaft 14 fall within the longitudinal width of the input-side gear 46 attached to the pinion gear shaft 15. The final gear shaft 16 is disposed in the rear and below the pinion gear shaft 15. With such arrangement, the shaft center line O2 of the speed-change shaft 12 is located above the shaft center line O6 of the final gear shaft by a distance substantially corresponding to the diameter of the large-diameter final gear 45. Further, the shaft center line O1 of the input shaft 11 is located above the upper end of the output-side lower-speed gear 36 of the speed-change shaft 12.

A scraping oil passage 200 is formed from the lower end portion of the final gear 45 along the outer peripheral end of the rear portion of the final gear 45. The oil passage 200 extends forward and upward along the rear wall of the transmission case 7, and reaches the oil supply chamber 61 at the left end portion of the speed-change shaft 12. The guide plate 72 which corresponds to the scraping oil passage in shape is arranged on the right side of the scraping oil passage 200.

In FIG. 14, the impeller 101 is disposed in the first oil storage chamber 71, and is fixed to the small-diameter portion 12*b* at the right end of the speed-change shaft 12 with the three whirl-stop pins 104 and the circlip 103. Thus, the impeller 101 rotates integrally with the speed-change shaft 12 at all times. The oil storage chamber communicating passage 97 is shaped like an L, and communicates the second oil storage chamber 96 of the input shaft 11 with the first oil storage chamber 71 of the speed-change shaft 12.

In the second embodiment, as apparent from FIG. 13, the longitudinal distance M between the shaft center line O1 of the input shaft 11 and the shaft center line O6 of the final gear shaft 16 is much smaller than the distance M in the first embodiment. This can make the entire transmission compact in the longitudinal direction.

Other Embodiments (1) Each of the embodiments is applied to lubrication for gears and bearings of the speed-change shaft and the input shaft of the gear transmission. However, the embodiments may be applied to lubrication for various rotating shafts to be lubricated.

(2) The present invention is not limited to the configuration described in the embodiments, and includes various modifications within the scope of appended claims.

What is claimed is:

1. A lubricating apparatus for rotating shafts in a case, the lubricating apparatus comprising:
   a first rotating shaft including an axially-extending first oil passage, the first oil passage configured to be supplied with oil stored in the case;
   a second rotating shaft disposed at a distance from the first rotating shaft in a radial direction of the first rotating shaft;
   a first oil storage chamber communicating with an outlet of the first oil passage such that the oil supplied to the first oil passage is discharged into the first oil storage chamber; and
   an impeller located in the first oil storage chamber, the impeller being fixed to an axial end of the first rotating shaft;
   wherein the impeller is configured to scatter oil in the radial direction within the first oil storage chamber due to rotation of the first rotating shaft to supply the oil to the second rotating shaft.

2. The lubricating apparatus for rotating shafts according to claim 1, further comprising:
   a pair of support walls for rotatably supporting both axial ends of the second rotating shaft via a pair of respective bearings;
   a second oil storage chamber surrounded by a first one of the support walls and an axial end surface of the second rotating shaft; and
   an oil storage chamber communicating passage for allowing the first oil storage chamber to communicate with the second oil storage chamber.

3. The lubricating apparatus for rotating shafts according to claim 2, wherein
   the second rotating shaft includes an axially-extending second oil passage, and
   one of the bearings located at a second one of the support walls is configured to be supplied with oil in the second oil storage chamber via the second oil passage.

4. The lubricating apparatus for rotating shafts according to claim 3, further comprising a plurality of guide ribs protruding from the first one of the support walls toward the axial end surface of the second rotating shaft in the second oil storage chamber, the plurality of guide ribs including a first guide rib extending from an radial outer side of the second oil storage chamber to a center portion corresponding to an opening of the second oil passage, and a second guide rib located adjacent to the first guide rib with a distance therebetween,
   wherein the plurality of guide ribs are configured such that, during rotation of the second rotating shaft, at least two oil flow paths extending from a radial outer portion of the second oil storage chamber toward the center portion along a longitudinal direction of the guide ribs are formed between adjacent guide ribs.

5. The lubricating apparatus for rotating shafts according to claim 1, further comprising a third rotating shaft including a gear portion, the gear portion being at least partially dipped in oil stored in the case,
   wherein the first oil passage is configured to be supplied with oil scraped by the gear portion due to rotation of the third rotating shaft, and wherein a shaft center line of the second rotating shaft is located above an upper end portion of the gear portion.

6. A vehicle gear transmission comprising the lubricating apparatus of claim 5
wherein second rotating shaft is an input shaft receiving a driving force outputted from a motor, and
wherein the third rotating shaft is an output shaft outputting a driving force changed by the gear transmission in speed to a driving wheel.

7. The lubricating apparatus for rotating shafts according to claim 1, wherein the first oil passage is an internal axially-extending oil passage within the first rotating shaft.

8. The lubricating apparatus for rotating shafts according to claim 1, wherein the impeller is configured to pump oil from the first oil storage chamber to a second oil storage chamber via an oil storage communicating passage, the second rotating shaft being supplied with oil within the second oil storage chamber.

* * * * *